United States Patent
Zhou et al.

(10) Patent No.: US 9,924,384 B2
(45) Date of Patent: Mar. 20, 2018

(54) METHOD AND APPARATUS FOR OPTIMIZING NEIGHBOR RELATION

(71) Applicant: Huawei Technologies Co., Ltd., Shenzhen (CN)

(72) Inventors: Qiang Zhou, Chengdu (CN); Xi Luo, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/177,880

(22) Filed: Jun. 9, 2016

(65) Prior Publication Data

US 2016/0286414 A1    Sep. 29, 2016

Related U.S. Application Data

(63) Continuation of application No. PCT/CN2013/089247, filed on Dec. 12, 2013.

(51) Int. Cl.
*H04W 40/00* (2009.01)
*H04W 24/02* (2009.01)
(Continued)

(52) U.S. Cl.
CPC .......... *H04W 24/02* (2013.01); *H04W 24/10* (2013.01); *H04W 36/0083* (2013.01); *H04W 84/18* (2013.01); *H04W 88/14* (2013.01)

(58) Field of Classification Search
CPC ..... H04W 36/30; H04W 36/21; H04W 36/18; H04W 16/18; H04W 8/183; H04W 92/02; H04W 60/00
See application file for complete search history.

(56) References Cited

U.S. PATENT DOCUMENTS 7,720,061 B1 * 5/2010 Krishnaswamy ....... H04L 45/00
370/389
8,649,791 B1 * 2/2014 Wohld .............. H04W 36/0083
455/446

(Continued)

FOREIGN PATENT DOCUMENTS

CN    101321355 A    12/2008
CN    101478739 A    7/2009
(Continued)

OTHER PUBLICATIONS

Govender, Poovendren, et al., "A Self Optimising Algorithm for WCDMA Neighbour Lists using Fuzzy Logic," Second International Conference on Computational Intelligence, Modelling and Simulation, IEEE Computer Society, Sep. 28, 2010, XP031885815, 6 pages.

*Primary Examiner* — Steve D Agosta
(74) *Attorney, Agent, or Firm* — Slater Matsil, LLP

(57) ABSTRACT

Embodiments of the present invention provide a method and an apparatus for optimizing a neighbor relation. The method for optimizing a neighbor relation in the present invention includes: determining, by a centralized device, to-be-processed neighboring cells according to a preset rule, generating an optimization suggestion according to the determined to-be-processed neighboring cells, and delivering the optimization suggestion to a radio network controller RNC, so that the RNC optimizes the to-be-processed neighboring cells according to the optimization suggestion. According to the embodiments of the present invention, automatic optimization of the neighbor relation is implemented.

14 Claims, 9 Drawing Sheets

(51) Int. Cl.
*H04W 36/00* (2009.01)
*H04W 24/10* (2009.01)
H04W 84/18 (2009.01)
H04W 88/14 (2009.01)

(56) References Cited

U.S. PATENT DOCUMENTS

| | | | |
|---|---|---|---|
| 9,179,363 B2* | 11/2015 | Siomina | H04W 28/0236 |
| 2004/0166858 A1* | 8/2004 | Masuda | H04W 36/0061 |
| | | | 455/436 |
| 2010/0278161 A1 | 11/2010 | Ore et al. | |
| 2011/0028181 A1 | 2/2011 | Byun et al. | |
| 2012/0252448 A1* | 10/2012 | Martin | H04W 36/0083 |
| | | | 455/435.1 |
| 2013/0109380 A1* | 5/2013 | Centonza | H04W 36/0083 |
| | | | 455/434 |

FOREIGN PATENT DOCUMENTS

| | | |
|---|---|---|
| CN | 101959222 A | 1/2011 |
| CN | 102238596 A | 11/2011 |
| CN | 102307370 A | 1/2012 |
| CN | 102457872 A | 5/2012 |
| CN | 103354647 A | 10/2013 |
| EP | 2519045 A1 | 10/2012 |

\* cited by examiner

METHOD AND APPARATUS FOR OPTIMIZING NEIGHBOR RELATION

CROSS-REFERENCE TO RELATED APPLICATIONS

This application is a continuation of International Application No. PCT/CN2013/089247, filed on Dec. 12, 2013, which is hereby incorporated by reference in its entirety.

TECHNICAL FIELD

Embodiments of the present invention relate to the communications field, and in particular, to a method and an apparatus for optimizing a neighbor relation.

BACKGROUND

An automatic neighbor relation (ANR) is one of features of a self organizing network (SON) that draws the greatest concern from the industry. Because of complexity of network development and emergence of a network featuring multiple standards, multiple levels, and multiple station types, a quantity of neighbor relations and switching types are dramatically increasing. As a result, it is very difficult to manage and maintain a neighboring cell; therefore, operators are pinning wishes on the ANR function, hoping that neighboring cell management and optimization are automatically completed by using a system.

However, at present, the neighbor relation is optimized mainly in an offline and semi-automatic optimization manner: First, data is exported from a network element such as a radio network controller (RNC) by means of manual intervention; then, the data is imported into a network planning and optimization tool for analyzing the neighbor relation; and finally, the network planning and optimization tool provides a result of analyzing the neighbor relation, and a neighboring cell configuration is manually modified according to the result of analyzing the neighbor relation. Therefore, a problem exists in this manner that a neighbor relation cannot be automatically optimized because a data source cannot be automatically acquired, but data needs to be manually imported into the network planning and optimization tool.

SUMMARY

Embodiments of the present invention provide a method and an apparatus for optimizing a neighbor relation to resolve a problem in the prior art that the neighbor relation cannot be automatically optimized.

According to a first aspect, an embodiment of the present invention provides a method for optimizing a neighbor relation, including: determining, by a centralized device, to-be-processed neighboring cells according to a preset rule; generating, by the centralized device, an optimization suggestion according to the determined to-be-processed neighboring cells; and delivering, by the centralized device, the optimization suggestion to a radio network controller RNC, so that the RNC optimizes the to-be-processed neighboring cells according to the optimization suggestion.

In a first possible implementation manner of the first aspect, before the determining, by a centralized device, to-be-processed neighboring cells according to a preset rule, the method further includes: acquiring, by the centralized device from the RNC, a measurement report obtained based on measurement performed on a to-be-measured cell by user equipment UE within a coverage area of a serving cell, where the serving cell is a UMTS cell, and the to-be-measured cell includes an intra-frequency cell of the serving cell, or an inter-frequency cell or a GSM cell; determining, by the centralized device, whether a first count value reaches a preset missing neighboring cell detection period; and if it is determined that the first count value reaches the missing neighboring cell detection period, acquiring, by the centralized device, a first missing neighboring cell list from the RNC, where the first missing neighboring cell list is a list including cells that are selected from the to-be-measured cell by the RNC according to the measurement report and that are not in a neighboring cell list of the serving cell.

According to the first possible implementation manner of the first aspect, in a second possible implementation manner, the determining, by a centralized device, to-be-processed neighboring cells according to a preset rule includes: determining, by the centralized device, distances between each cell in the first missing neighboring cell list and the serving cell; using, by the centralized device, cells whose distances between each cell in the first missing neighboring cell list and the serving cell are less than or equal to a preset missing distance threshold as to-be-sorted cells, sorting all the to-be-sorted cells according to the distances between the to-be-sorted cells and the serving cell to acquire a sorted missing neighboring cell list, and using the sorted missing neighboring cell list as a second missing neighboring cell list; and acquiring, by the centralized device, a third missing neighboring cell list after removal of a cell in a blacklist from the second missing neighboring cell list, and determining the to-be-processed neighboring cells from the third missing neighboring cell list according to a preset maximum quantity of neighboring cells of the serving cell.

According to the first aspect and either of the first to the second possible implementation manners of the first aspect, in a third possible implementation manner, the generating, by the centralized device, an optimization suggestion according to the determined to-be-processed neighboring cells includes: acquiring, by the centralized device, cell identification information of the to-be-processed neighboring cells and configuration parameters of the to-be-processed neighboring cells; and generating, by the centralized device, an optimization suggestion for missing neighboring cells according to the cell identification information of the to-be-processed neighboring cells and the configuration parameters of the to-be-processed neighboring cells, where the optimization suggestion for missing neighboring cells is used to instruct the RNC to add the to-be-processed neighboring cells to the neighboring cell list.

According to the third possible implementation manner of the first aspect, in a fourth possible implementation manner, after the delivering, by the centralized device, the optimization suggestion to a radio network controller RNC, the method further includes: adding, by the centralized device, one to a second count value, where the second count value is used to describe a quantity of times of delivering the optimization suggestion for missing neighboring cells to the RNC, and determining whether a second count value to which one is added is less than a preset quantity of missing neighboring cell detection times. If it is determined that the second count value to which one is added is less than the quantity of missing neighboring cell detection times, repeatedly performing the step of acquiring, by the centralized device from the RNC, a measurement report obtained based on measurement performed on a to-be-measured cell by UE within a coverage area of a serving cell.

According to the first aspect, in a fifth possible implementation manner, before the determining, by a centralized device, to-be-processed neighboring cells according to a preset rule, the method further includes: acquiring, by the centralized device from the RNC, handover-related performance data of user equipment UE within a coverage area of a serving cell, where the serving cell is a UMTS cell; and determining, by the centralized device, whether a third count value reaches a preset redundant neighboring cell detection period. If it is determined that the third count value reaches the redundant neighboring cell detection period, acquiring, by the centralized device, a first redundant neighboring cell list of the serving cell according to the performance data.

According to the fifth possible implementation manner of the first aspect, in a sixth possible implementation manner, the determining, by a centralized device, to-be-processed neighboring cells according to a preset rule includes: removing, by the centralized device according to a cell in a whitelist preset by a user, the cell in the whitelist from the first redundant neighboring cell list; and determining, by the centralized device, cells in a new neighboring cell list acquired after removal of the cell in the whitelist as the to-be-processed neighboring cells, where each of the to-be-processed neighboring cells includes an intra-frequency cell of the serving cell, or an inter-frequency cell or a GSM cell.

According to the fifth or the sixth possible implementation manner of the first aspect, in a seventh possible implementation manner, the generating, by the centralized device, an optimization suggestion according to the determined to-be-processed neighboring cells includes: generating, by the centralized device, an optimization suggestion for redundant neighboring cells according to the determined to-be-processed neighboring cells, where the optimization suggestion for redundant neighboring cells is used to instruct the RNC to delete the to-be-processed neighboring cells from the neighboring cell list.

According to the seventh possible implementation manner of the first aspect, in an eighth possible implementation manner, after the delivering, by the centralized device, the optimization suggestion to a radio network controller RNC, the method further includes: adding, by the centralized device, one to a fourth count value, where the fourth count value is used to describe a quantity of times of delivering the optimization suggestion for redundant neighboring cells to the RNC, and determining whether a fourth count value to which one is added is less than a preset quantity of redundant neighboring cell detection times. If it is determined that the fourth count value to which one is added is less than the quantity of redundant neighboring cell detection times, repeatedly performing the step of acquiring, by the centralized device from the RNC, handover-related performance data of user equipment UE within a coverage area of a serving cell.

According to the first aspect, in a ninth possible implementation manner, the determining, by a centralized device, to-be-processed neighboring cells according to a preset rule includes: determining, by the centralized device, whether a fifth count value reaches a preset neighboring cell priority optimization period. If it is determined that the fifth count value reaches the neighboring cell priority optimization period, sorting, by the centralized device, neighboring cells of a same type according to a quantity of handover success times of handovers to each cell of the neighboring cells of the same type, and acquiring at least one neighboring cell queue after sorting, where the neighboring cells of the same type are UMTS intra-frequency cells, UMTS inter-frequency cells, or GSM cells. The method further includes selecting, by the centralized device, $K_i$ neighboring cells from each neighboring cell queue of the at least one neighboring cell queue according to a preset proportion threshold a and according to a sorting sequence as the to-be-processed neighboring cells, where $K_i=a \times M_i$, $K_i$ indicates a quantity of neighboring cells selected from an $i^{th}$ neighboring cell queue, $M_i$ indicates a quantity of neighboring cells included in the $i^{th}$ neighboring cell queue, and i is an integer greater than or equal to 1, and less than or equal to 3.

According to the ninth possible implementation manner of the first aspect, in a tenth possible implementation manner, the generating, by the centralized device, an optimization suggestion according to the determined to-be-processed neighboring cells includes generating, by the centralized device, an optimization suggestion according to a handover success rate of handovers to a neighboring cell of the $K_i$ neighboring cells.

According to the tenth possible implementation manner of the first aspect, in an eleventh possible implementation manner, the generating, by the centralized device, an optimization suggestion according to a handover success rate of handovers to a neighboring cell of the $K_i$ neighboring cells includes: if a handover success rate of handovers to a first neighboring cell of the $K_i$ neighboring cells is greater than or equal to a preset high threshold for a handover success rate, generating, by the centralized device, an optimization suggestion of increasing a priority of the first neighboring cell by one level. If a handover success rate of handovers to a second neighboring cell of the $K_i$ neighboring cells is less than the high threshold for a handover success rate, and greater than a low threshold for a handover success rate, generating, by the centralized device, an optimization suggestion of remaining a priority of the second neighboring cell unchanged. If a handover success rate of handovers to a third neighboring cell of the $K_i$ neighboring cells is less than or equal to the low threshold for a handover success rate, generating, by the centralized device, an optimization suggestion of lowering a priority of the third neighboring cell by one level.

According to the eleventh possible implementation manner of the first aspect, in a twelfth possible implementation manner, after the delivering, by the centralized device, the optimization suggestion to a radio network controller RNC, the method further includes: adding, by the centralized device, one to a sixth count value, where the sixth count value is used to describe a quantity of times of delivering the optimization suggestion to the RNC, and determining whether a sixth count value to which one is added is less than a preset quantity of neighboring cell priority optimization times. If it is determined that the sixth count value to which one is added is less than the quantity of neighboring cell priority optimization times, repeatedly performing the step of determining, by the centralized device, whether a fifth count value reaches a preset neighboring cell priority optimization period.

According to the first aspect, in a thirteenth possible implementation manner, before the determining, by a centralized device, to-be-processed neighboring cells according to a preset rule, the method further includes: determining, by the centralized device, whether a seventh count value reaches a preset neighbor relation optimization detection period; and if it is determined that the seventh count value reaches the neighbor relation optimization detection period, determining, by the centralized device, an eNodeB that includes an LTE cell and that is within a range of a circle with a center being a UMTS cell whose neighbor relation needs to be optimized and with a radius being a preset distance, or determining, by the centralized device, the eNodeB that includes the LTE cell and an eNodeB that includes a configured LTE neighboring cell of the UMTS cell whose neighbor relation needs to be optimized.

According to the thirteenth possible implementation manner of the first aspect, in a fourteenth possible implementation manner, the determining, by a centralized device, to-be-processed neighboring cells according to a preset rule includes: acquiring, by the centralized device, a first potential LTE neighboring cell of the UMTS cell whose neighbor relation needs to be optimized and a measurement report of the first potential LTE neighboring cell; acquiring, by the centralized device, a second potential LTE neighboring cell after LTE cells that cannot be added or deleted are removed from the first potential LTE neighboring cell; and sorting, by the centralized device, cells of the second potential LTE neighboring cell according to a handover success rate, a quantity of handover request times, or a quantity of measurement reports of the second potential LTE neighboring cell, and determining, according to a preset maximum quantity of added neighboring cells, N cells that rank ahead as the to-be-processed neighboring cells, where N is equal to a difference between the maximum quantity of added neighboring cells and a quantity of LTE cells that cannot be deleted. The first potential LTE neighboring cell is acquired by the centralized device according to measurement that is performed by the eNodeB that includes the LTE cell on the UMTS cell in a neighbor relation list of the LTE cell. Alternatively, the first potential LTE neighboring cell is acquired by the centralized device according to measurement that is performed by the eNodeB that includes the LTE cell on the UMTS cell in a neighbor relation list of the LTE cell and measurement that is performed by the eNodeB that includes the LTE neighboring cell on the UMTS cell in a neighbor relation list of the LTE neighboring cell.

According to the thirteenth or the fourteenth possible implementation manner of the first aspect, in a fifteenth possible implementation manner, the generating, by the centralized device, an optimization suggestion according to the determined to-be-processed neighboring cells includes: acquiring, by the centralized device, cell identification information of the to-be-processed neighboring cells and configuration parameters of the to-be-processed neighboring cells; and generating, by the centralized device, an optimization suggestion of optimizing a neighbor relation according to the cell identification information of the to-be-processed neighboring cells and the configuration parameters of the to-be-processed neighboring cells, where the optimization suggestion of optimizing the neighbor relation is used to instruct the RNC to add the to-be-processed neighboring cells to a neighboring cell list of the UMTS cell whose neighbor relation needs to be optimized.

According to the fifteenth possible implementation manner of the first aspect, in a sixteenth possible implementation manner, after the delivering, by the centralized device, the optimization suggestion to a radio network controller RNC, the method further includes: adding, by the centralized device, one to an eighth count value, where the eighth count value is used to describe a quantity of times of delivering the optimization suggestion of optimizing the neighbor relation to the RNC, and determining whether an eighth count value to which one is added is less than a preset quantity of neighbor relation optimization execution times. If it is determined that the eighth count value to which one is added is less than the quantity of neighbor relation optimization execution times, repeatedly performing the step of determining, by the centralized device, whether a seventh count value reaches a preset neighbor relation optimization detection period.

According to a second aspect, an embodiment of the present invention provides an apparatus for optimizing a neighbor relation is provided, including: a determining module, configured to determine to-be-processed neighboring cells according to a preset rule; an optimization suggestion generating module, configured to generate an optimization suggestion according to the determined to-be-processed neighboring cells; and an optimization suggestion delivering module, configured to deliver the optimization suggestion to a radio network controller RNC, so that the RNC optimizes the to-be-processed neighboring cells according to the optimization suggestion.

In a first possible implementation manner of the second aspect, the apparatus further includes: before determining the to-be-processed neighboring cells according to the preset rule, the determining module is further configured to acquire, from the radio network controller RNC, a measurement report obtained based on measurement performed on a to-be-measured cell by user equipment UE within a coverage area of a serving cell, where the serving cell is a UMTS cell, and the to-be-measured cell includes an intra-frequency cell of the serving cell, or an inter-frequency cell or a GSM cell; determine whether a first count value reaches a preset missing neighboring cell detection period; and if it is determined that the first count value reaches the missing neighboring cell detection period, acquire a first missing neighboring cell list from the RNC, where the first missing neighboring cell list is a list including cells that are selected from the to-be-measured cell by the RNC according to the measurement report and that are not in a neighboring cell list of the serving cell.

According to the first possible implementation manner of the second aspect, in a second possible implementation manner, the determining module is specifically configured to determine distances between each cell in the first missing neighboring cell list and the serving cell; use cells whose distances between each cell in the first missing neighboring cell list and the serving cell are less than or equal to a preset missing distance threshold as to-be-sorted cells, sort all the to-be-sorted cells according to distances between the to-be-sorted cells and the serving cell to acquire a sorted missing neighboring cell list, and use the sorted missing neighboring cell list as a second missing neighboring cell list; and acquire a third missing neighboring cell list after removal of a cell in a blacklist from the second missing neighboring cell list, and determine the to-be-processed neighboring cells from the third missing neighboring cell list according to a preset maximum quantity of neighboring cells of the serving cell.

According to the second aspect and either of the first to the second possible implementation manners of the second aspect, in a third possible implementation manner, the optimization suggestion generating module is specifically configured to acquire cell identification information of the to-be-processed neighboring cells and configuration parameters of the to-be-processed neighboring cells; and generate an optimization suggestion for missing neighboring cells according to the cell identification information of the to-be-processed neighboring cells and the configuration parameters of the to-be-processed neighboring cells, where the optimization suggestion for missing neighboring cells is used to instruct the RNC to add the to-be-processed neighboring cells to the neighboring cell list.

According to the third possible implementation manner of the second aspect, in a fourth possible implementation manner, the determining module is further configured to: after the optimization suggestion is delivered to the radio network controller RNC, add one to a second count value, where the second count value is used to describe a quantity of times of delivering the optimization suggestion for missing neighboring cells to the RNC, and determine whether a second count value to which one is added is less than a preset quantity of missing neighboring cell detection times; and if it is determined that the second count value to which one is added is less than the quantity of missing neighboring cell detection times, repeatedly perform the step of acquiring, from the RNC, a measurement report obtained based on measurement performed on a to-be-measured cell by UE within a coverage area of a serving cell.

According to the second aspect, in a fifth possible implementation manner, the determining module is further configured to: before determining the to-be-processed neighboring cells according to the preset rule, acquire, from the radio network controller RNC, handover-related performance data of user equipment UE within a coverage area of a serving cell, where the serving cell is a UMTS cell; determine whether a third count value reaches a preset redundant neighboring cell detection period; and if it is determined that the third count value reaches the redundant neighboring cell detection period, acquire a first redundant neighboring cell list of the serving cell according to the performance data.

According to the fifth possible implementation manner of the second aspect, in a sixth possible implementation manner, the determining module is specifically configured to remove, according to a cell in a whitelist preset by a user, the cell in the whitelist from the first redundant neighboring cell list; and determine cells in a new neighboring cell list acquired after removal of the cell in the whitelist as the to-be-processed neighboring cells, where each of the to-be-processed neighboring cells includes an intra-frequency cell of the serving cell, or an inter-frequency cell or a GSM cell.

According to the fifth or the sixth possible implementation manner of the second aspect, in a seventh possible implementation manner, the optimization suggestion generating module is specifically configured to generate an optimization suggestion for redundant neighboring cells according to the determined to-be-processed neighboring cells, where the optimization suggestion for redundant neighboring cells is used to instruct the RNC to delete the to-be-processed neighboring cells from the neighboring cell list.

According to the seventh possible implementation manner of the second aspect, in an eighth possible implementation manner, the determining module is further configured to: after the optimization suggestion is delivered to the radio network controller RNC, add one to a fourth count value, where the fourth count value is used to describe a quantity of times of delivering the optimization suggestion for redundant neighboring cells to the RNC, and determine whether a fourth count value to which one is added is less than a preset quantity of redundant neighboring cell detection times; and if it is determined that the fourth count value to which one is added is less than the quantity of redundant neighboring cell detection times, repeatedly perform the step of acquiring, from the RNC, handover-related performance data of UE within a coverage area of a serving cell.

According to the second aspect, in a ninth possible implementation manner, the determining module is specifically configured to: determine whether a fifth count value reaches a preset neighboring cell priority optimization period; if it is determined that the fifth count value reaches the neighboring cell priority optimization period, sort neighboring cells of a same type according to a quantity of handover success times of handovers to each cell of the neighboring cells of the same type, and acquire at least one neighboring cell queue after sorting, where the neighboring cells of the same type are UMTS intra-frequency cells, UMTS inter-frequency cells, or GSM cells; and select $K_i$ neighboring cells from each neighboring cell queue of the at least one neighboring cell queue according to a preset proportion threshold a and according to a sorting sequence as the to-be-processed neighboring cells, where $K_i=a \times M_i$, $K_i$ indicates a quantity of neighboring cells selected from an $i^{th}$ neighboring cell queue, $M_i$ indicates a quantity of neighboring cells included in the $i^{th}$ neighboring cell queue, and i is an integer greater than or equal to 1, and less than or equal to 3.

According to the ninth possible implementation manner of the second aspect, in a tenth possible implementation manner, the optimization suggestion generating module is specifically configured to generate an optimization suggestion according to a handover success rate of handovers to a neighboring cell of the $K_i$ neighboring cells.

According to the tenth possible implementation manner of the second aspect, in an eleventh possible implementation manner, the optimization suggestion generating module is specifically configured to: if a handover success rate of handovers to a first neighboring cell of the $K_i$ neighboring cells is greater than or equal to a preset high threshold for a handover success rate, generate an optimization suggestion of increasing a priority of the first neighboring cell by one level; if a handover success rate of handovers to a second neighboring cell of the $K_i$ neighboring cells is less than the high threshold for a handover success rate, and greater than a low threshold for a handover success rate, generate an optimization suggestion of remaining a priority of the second neighboring cell unchanged; and if a handover success rate of handovers to a third neighboring cell of the $K_i$ neighboring cells is less than or equal to the low threshold for a handover success rate, generate an optimization suggestion of lowering a priority of the third neighboring cell by one level.

According to the eleventh possible implementation manner of the second aspect, in a twelfth possible implementation manner, the determining module is further configured to: after the optimization suggestion is delivered to the radio network controller RNC, add one to a sixth count value, where the sixth count value is used to describe a quantity of times of delivering the optimization suggestion to the RNC, and determine whether a sixth count value to which one is added is less than a preset quantity of neighboring cell priority optimization times; and if it is determined that the sixth count value to which one is added is less than the quantity of neighboring cell priority optimization times, repeatedly perform the step of determining whether a fifth count value reaches a preset neighboring cell priority optimization period.

According to the second aspect, in a thirteenth possible implementation manner, the determining module is further configured to: before determining the to-be-processed neighboring cells according to the preset rule, determine whether a seventh count value reaches a preset neighbor relation optimization detection period; and if it is determined that the seventh count value reaches the neighbor relation optimization detection period, determine an eNodeB that includes an LTE cell and that is within a range of a circle with a center being a UMTS cell whose neighbor relation needs to be optimized and with a radius being a preset distance, or determine the eNodeB that includes the LTE cell and an eNodeB that includes a configured LTE neighboring cell of the UMTS cell whose neighbor relation needs to be optimized.

According to the thirteenth possible implementation manner of the second aspect, in a fourteenth possible implementation manner, the determining module is specifically configured to: acquire a first potential LTE neighboring cell of the UMTS cell whose neighbor relation needs to be optimized and a measurement report of the first potential LTE neighboring cell; acquire a second potential LTE neighboring cell after LTE cells that cannot be added or deleted are removed from the first potential LTE neighboring cell; and sort cells of the second potential LTE neighboring cell according to a handover success rate, a quantity of handover request times, or a quantity of measurement reports of the second potential LTE neighboring cell, and determine, according to a preset maximum quantity of added neighboring cells, N cells that rank ahead as the to-be-processed neighboring cells, where N is equal to a difference between the maximum quantity of added neighboring cells and a quantity of LTE cells that cannot be deleted. The first potential LTE neighboring cell is acquired according to measurement that is performed by the eNodeB that includes the LTE cell on the UMTS cell in a neighbor relation list of the LTE cell. Alternatively, the first potential LTE neighboring cell is acquired according to measurement that is performed by the eNodeB that includes the LTE cell on the UMTS cell in a neighbor relation list of the LTE cell and measurement that is performed by the eNodeB that includes the LTE neighboring cell on the UMTS cell in a neighbor relation list of the LTE neighboring cell.

According to the thirteenth or the fourteenth possible implementation manner of the second aspect, in a fifteenth possible implementation manner, the optimization suggestion generating module is specifically configured to acquire cell identification information of the to-be-processed neighboring cells and configuration parameters of the to-be-processed neighboring cells; and generate an optimization suggestion of optimizing a neighbor relation according to the cell identification information of the to-be-processed neighboring cells and the configuration parameters of the to-be-processed neighboring cells, where the optimization suggestion of optimizing the neighbor relation is used to instruct the RNC to add the to-be-processed neighboring cells to a neighboring cell list of the UMTS cell whose neighbor relation needs to be optimized.

According to the fifteenth possible implementation manner of the second aspect, in a sixteenth possible implementation manner, the determining module is further configured to: after the optimization suggestion is delivered to the radio network controller RNC, add one to an eighth count value, where the eighth count value is used to describe a quantity of times of delivering the optimization suggestion of optimizing the neighbor relation to the RNC, and determine whether an eighth count value to which one is added is less than a preset quantity of neighbor relation optimization execution times; and if it is determined that the eighth count value to which one is added is less than the quantity of neighbor relation optimization execution times, repeatedly perform the step of determining whether a seventh count value reaches a preset neighbor relation optimization detection period.

According to the method and apparatus for optimizing a neighbor relation in the embodiments of the present invention, a centralized device determines to-be-processed neighboring cells according to a preset rule, generates an optimization suggestion according to the determined to-be-processed neighboring cells, and delivers the optimization suggestion to a radio network controller RNC, so that the RNC optimizes the to-be-processed neighboring cells according to the optimization suggestion. As a result, a problem is resolved and automatic optimization of the neighbor relation is implemented.

BRIEF DESCRIPTION OF THE DRAWINGS

To describe the technical solutions in the embodiments of the present invention more clearly, the following briefly introduces the accompanying drawings required for describing the embodiments or the prior art. Apparently, the accompanying drawings in the following description show merely some embodiments of the present invention, and persons of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

Figure 1:
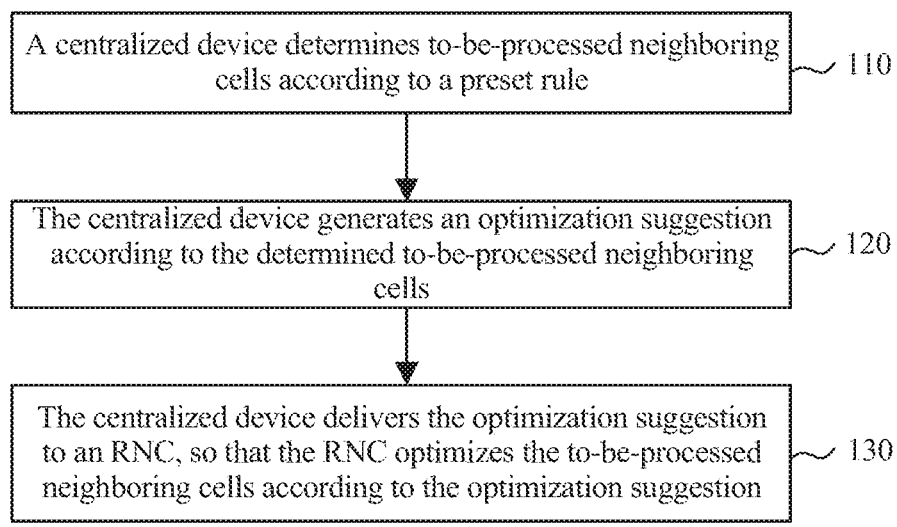
FIG. 1 is a flowchart of a method for optimizing a neighbor relation according to Embodiment 1 of the present invention.

FIG. 1 is a flowchart of a method for optimizing a neighbor relation according to Embodiment 1 of the present invention. The method in this embodiment applies to a case of automatically optimizing the neighbor relation. The method is performed by an apparatus for optimizing a neighbor relation, where the apparatus is generally implemented by using hardware and/or software. The method in this embodiment includes the following steps:

110. A centralized device determines to-be-processed neighboring cells according to a preset rule.

120. The centralized device generates an optimization suggestion according to the determined to-be-processed neighboring cells.

At present, the neighbor relation is optimized by manually exporting data from an RNC, where the exported data includes network performance management data, configuration data, measurement report data, and the like. Then the data is manually imported into a network planning and optimization tool, and the network planning and optimization tool analyzes the data and provides a result of the neighbor relation. In this method, a data source cannot be automatically acquired and data needs to be manually imported into the network planning and optimization tool. Therefore, automatic optimization of the neighbor relation cannot be implemented. However, in steps 110 and 120, the centralized device can determine the to-be-processed neighboring cells according to the preset rule, generate the optimization suggestion according to the determined to-be-processed neighboring cells, where the optimization suggestion may be generated without a need of manually acquiring the data source, and deliver the optimization suggestion to an RNC in step 130. The RNC performs optimization processing on the to-be-processed neighboring cells according to the optimization suggestion.

130. The centralized device delivers the optimization suggestion to an RNC, so that the RNC optimizes the to-be-processed neighboring cells according to the optimization suggestion.

Specifically, the centralized device determines the to-be-processed neighboring cells according to the preset rule, generates the optimization suggestion according to the determined to-be-processed neighboring cells, and delivers the optimization suggestion to the RNC, so that the RNC optimizes the to-be-processed neighboring cells according to the optimization suggestion.

According to the method for optimizing a neighbor relation provided in this embodiment, a centralized device determines to-be-processed neighboring cells according to a preset rule, generates an optimization suggestion according to the determined to-be-processed neighboring cells, and delivers the optimization suggestion to an RNC, so that the RNC optimizes the to-be-processed neighboring cells according to the optimization suggestion. As a result, automatic optimization of the neighbor relation is implemented.

Figure 2A:
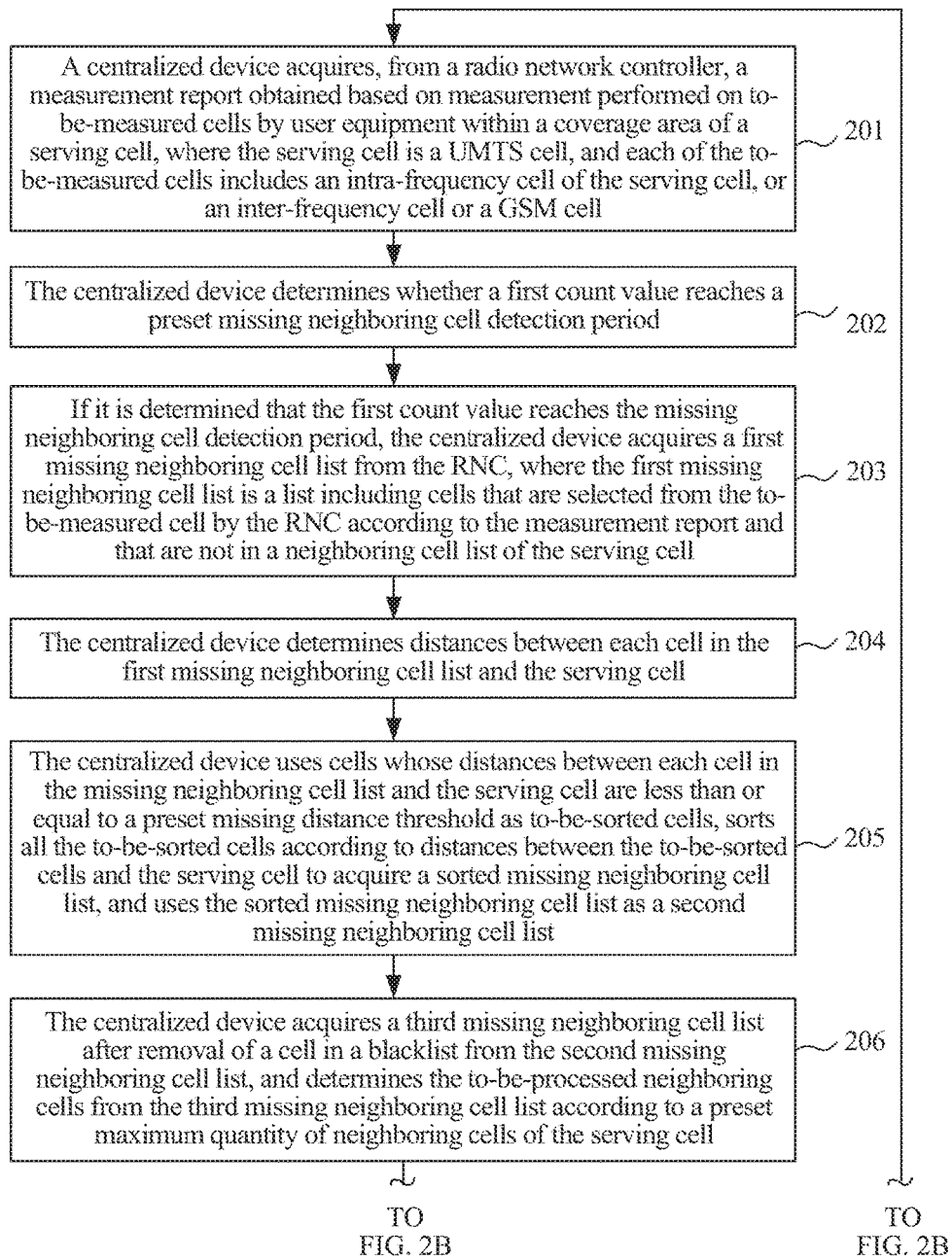
FIG. 2A and FIG. 2B are a flowchart of a method for optimizing a neighbor relation according to Embodiment 2 of the present invention.
Figure 2B:
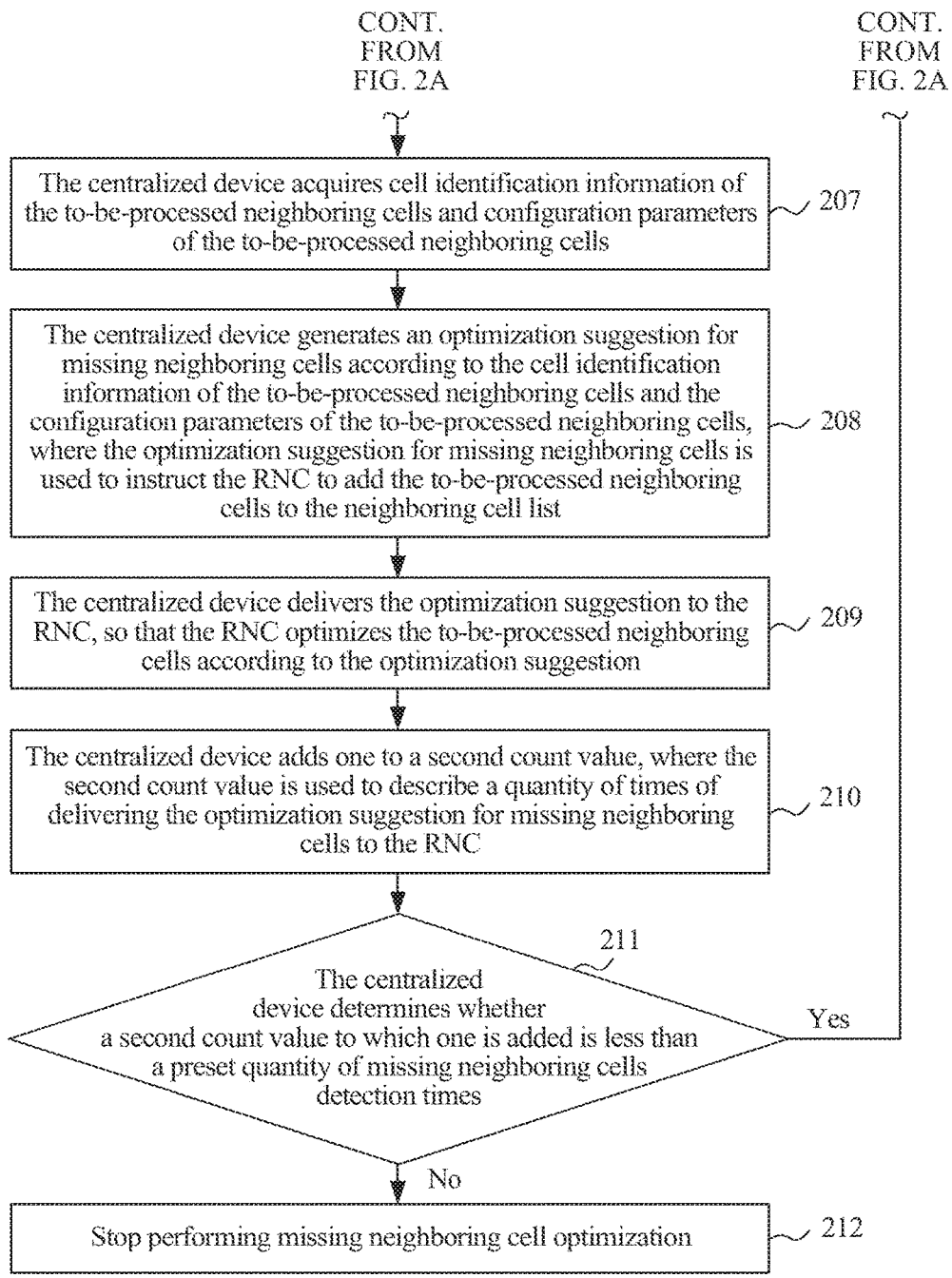

On the basis of the foregoing Embodiment 1, optimization is further performed in an embodiment. FIG. 2A and FIG. 2B are a flowchart of a method for optimizing a neighbor relation according to Embodiment 2 of the present invention. This embodiment describes a process for optimizing a missing configuration of a neighboring cell within a UMTS system and between a UMTS system and a GSM system. Referring to FIG. 2A and FIG. 2B, the method in this embodiment may include the following steps:

201. The centralized device acquires, from the radio network controller, a measurement report obtained based on measurement performed on a to-be-measured cell by user equipment within a coverage area of a serving cell, where the serving cell is a UMTS cell, and the to-be-measured cell includes an intra-frequency cell of the serving cell, or an inter-frequency cell or a GSM cell.

It should be noted that if the to-be-measured cell is the inter-frequency cell of the serving cell or the GSM cell, a radio access network needs to provide information about the to-be-measured cell to user equipment in a UMTS network, including a frequency channel number and a scrambling code of the to-be-measured cell, so that the user equipment in the UMTS network performs measurement on the inter-frequency cell or the GSM cell. In addition, a range of the scrambling code of the inter-frequency cell or the GSM cell cannot be excessively wide or excessively narrow. If the range of the scrambling code of the inter-frequency cell or the GSM cell is set excessively narrow, a to-be-measured cell is prone to be missing. The missing cell cannot join optimization of a missing neighboring cell, that is, the missing cell cannot be automatically added as a neighboring cell. If the range of the scrambling code of the inter-frequency cell or the GSM cell is set excessively wide, a cell that cannot be added as a neighboring cell is measured, which causes a waste of the measurement.

202. The centralized device determines whether a first count value reaches a preset missing neighboring cell detection period.

203. If it is determined that the first count value reaches the missing neighboring cell detection period, the centralized device acquires a first missing neighboring cell list from the RNC, where the first missing neighboring cell list is a list including cells that are selected from the to-be-measured cell by the RNC according to the measurement report and that are not in a neighboring cell list of the serving cell.

204. The centralized device determines distances between each cell in the first missing neighboring cell list and the serving cell.

205. The centralized device uses cells whose distances between each cell in the first missing neighboring cell list and the serving cell are less than or equal to a preset missing distance threshold as to-be-sorted cells, sorts all the to-be-sorted cells according to distances between the to-be-sorted cells and the serving cell to acquire a sorted missing neighboring cell list, and uses the sorted missing neighboring cell list as a second missing neighboring cell list.

206. The centralized device acquires a third missing neighboring cell list after removal of a cell in a blacklist from the second missing neighboring cell list, and determines the to-be-processed neighboring cells from the third missing neighboring cell list according to a preset maximum quantity of neighboring cells of the serving cell.

The preset maximum quantity of neighboring cells of the serving cell is set by a user. The preset maximum quantity of neighboring cells cannot exceed a quantity of neighboring cells of the UMTS cell, that is, a maximum of 63 intra-frequency neighboring cells, 64 inter-frequency neighboring cells, and 64 inter-RAT neighboring cells can be separately configured for each UMTS cell. In other words, a preset maximum quantity of intra-frequency neighboring cells cannot exceed 63, a preset maximum quantity of inter-frequency neighboring cells cannot exceed 64, and a preset maximum quantity of inter-RAT neighboring cells cannot exceed 64. In a current optimization process, if a quantity of each type of neighboring cells of the serving cell reaches an upper limit of neighboring cells, the current optimization automatically stops.

207. The centralized device acquires cell identification information of the to-be-processed neighboring cells and configuration parameters of the to-be-processed neighboring cells.

208. The centralized device generates an optimization suggestion for missing neighboring cells according to the cell identification information of the to-be-processed neighboring cells and the configuration parameters of the to-be-processed neighboring cells, where the optimization suggestion for missing neighboring cells is used to instruct the RNC to add the to-be-processed neighboring cells to the neighboring cell list.

209. The centralized device delivers the optimization suggestion to the RNC, so that the RNC optimizes the to-be-processed neighboring cells according to the optimization suggestion.

210. The centralized device adds one to a second count value, where the second count value is used to describe a quantity of times of delivering the optimization suggestion for missing neighboring cells to the RNC.

211. The centralized device determines whether a second count value to which one is added is less than a preset quantity of missing neighboring cell detection times. If yes, step 201 is performed; otherwise, step 212 is performed.

212. Stop performing missing neighboring cell optimization.

According to the method for optimizing a neighbor relation provided in this embodiment, a centralized device acquires, from an RNC, a measurement report obtained based on measurement performed on a to-be-measured cell by user equipment within a coverage area of a serving cell, and determines whether a first count value reaches a preset missing neighboring cell detection period. If it is determined that the first count value reaches the missing neighboring cell detection period, the centralized device acquires a first missing neighboring cell list from the RNC, determines distances between each cell in the first missing neighboring cell list and the serving cell, uses cells whose distances between each cell in the first missing neighboring cell list and the serving cell are less than or equal to a preset missing distance threshold as to-be-sorted cells, sorts all the to-be-sorted cells according to distances between the to-be-sorted cell and the serving cell to acquire a sorted missing neighboring cell list, and uses the sorted missing neighboring cell list as a second missing neighboring cell list. The centralized device acquires a third missing neighboring cell list after removal of a cell in a blacklist from the second missing neighboring cell list, and determines to-be-processed neighboring cells from the third missing neighboring cell list according to a preset maximum quantity of neighboring cells of the serving cell, acquires cell identification information of the to-be-processed neighboring cells and configuration parameters of the to-be-processed neighboring cells, generates an optimization suggestion for missing neighboring cells according to the cell identification information of the to-be-processed neighboring cells and the configuration parameters of the to-be-processed neighboring cells, where the optimization suggestion for missing neighboring cells is used to instruct the RNC to add the to-be-processed neighboring cells to the neighboring cell list, and delivers the optimization suggestion to the RNC, so that the RNC optimizes the to-be-processed neighboring cells according to the optimization suggestion, and adds one to a second count value, where the second count value is used to describe a quantity of times of delivering the optimization suggestion for missing neighboring cells to the RNC. The centralized device determines whether a second count value to which one is added is less than a preset quantity of missing neighboring cell detection times, and if yes, continues to perform missing neighboring cell optimization. As a result, a missing neighboring cell of a UMTS cell is added to a neighboring cell list of the cell, implementing automatic optimization of the neighbor relation.

Figure 3A:
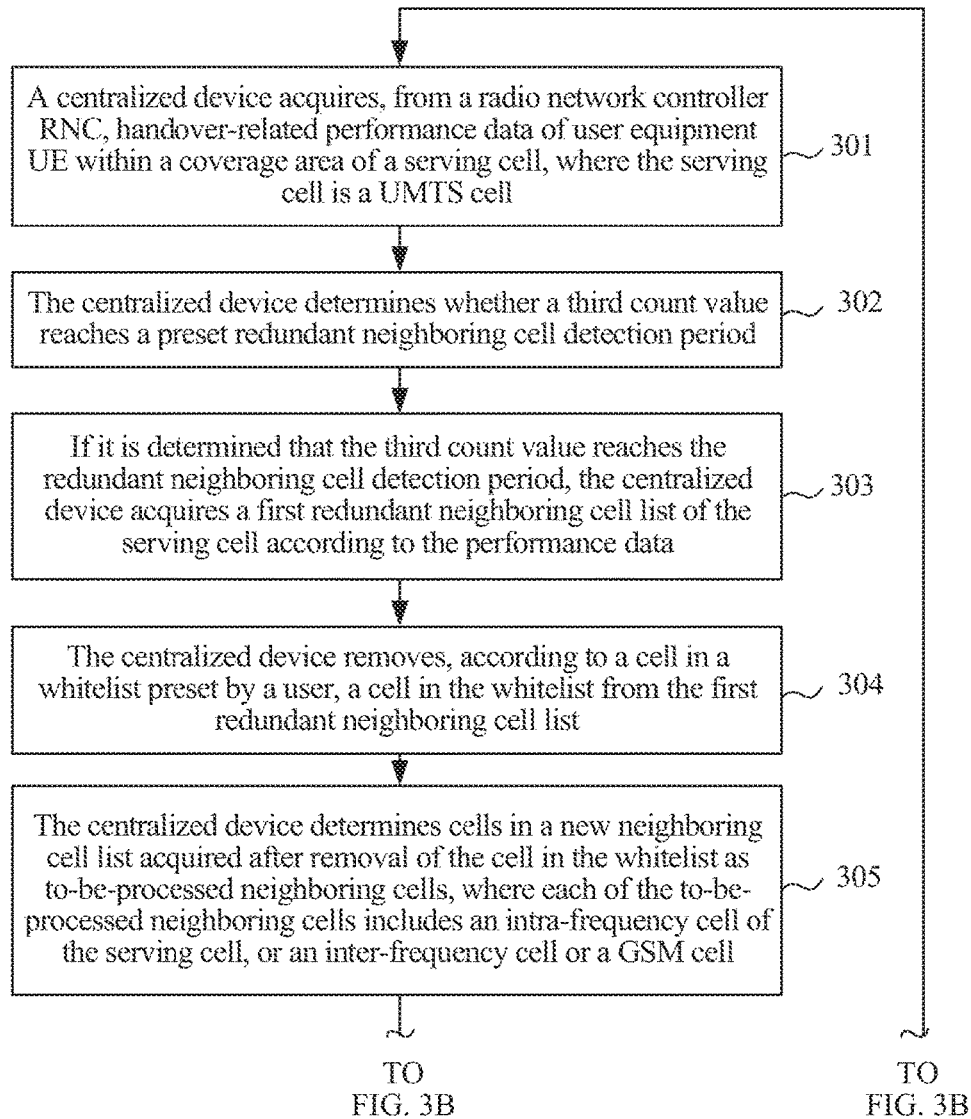
FIG. 3A and FIG. 3B are a flowchart of a method for optimizing a neighbor relation according to Embodiment 3 of the present invention.
Figure 3B:
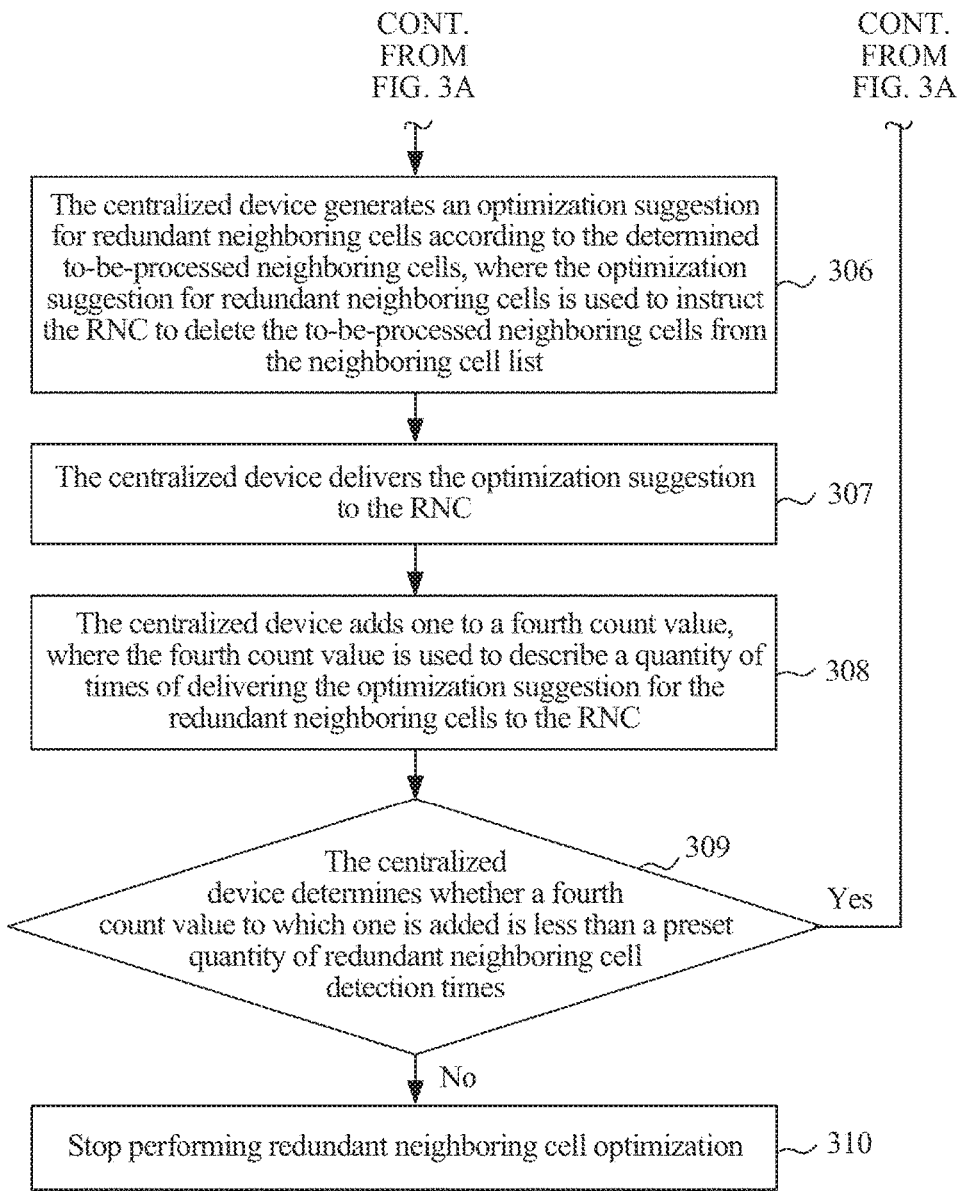

On the basis of the foregoing Embodiment 1, optimization is further performed in an embodiment. FIG. 3A and FIG. 3B are a flowchart of a method for optimizing a neighbor relation according to Embodiment 3 of the present invention. This embodiment describes a process for optimizing a redundant neighboring cell within a UMTS system and between a UMTS system and a GSM system. Referring to FIG. 3A and FIG. 3B, the method in this embodiment may include the following steps:

301. The centralized device acquires, from the radio network controller RNC, handover-related performance data of user equipment UE within a coverage area of a serving cell, where the serving cell is a UMTS cell.

302. The centralized device determines whether a third count value reaches a preset redundant neighboring cell detection period.

303. If it is determined that the third count value reaches the redundant neighboring cell detection period, the centralized device acquires a first redundant neighboring cell list of the serving cell according to the performance data.

304. The centralized device removes, according to a cell in a whitelist preset by a user, the cell in the whitelist from the first redundant neighboring cell list.

305. The centralized device determines cells in a new neighboring cell list acquired after removal of the cell in the whitelist as to-be-processed neighboring cells, where each of the to-be-processed neighboring cells includes an intra-frequency cell of the serving cell, or an inter-frequency cell or a GSM cell.

306. The centralized device generates an optimization suggestion for redundant neighboring cells according to the determined to-be-processed neighboring cells, where the optimization suggestion for redundant neighboring cells is used to instruct the RNC to delete the to-be-processed neighboring cells from the neighboring cell list.

307. The centralized device delivers the optimization suggestion to the RNC.

308. The centralized device adds one to a fourth count value, where the fourth count value is used to describe a quantity of times of delivering the optimization suggestion for redundant neighboring cells to the RNC.

309. The centralized device determines whether a fourth count value to which one is added is less than a preset quantity of redundant neighboring cell detection times. If yes, step 301 is performed; otherwise, step 310 is performed.

310. Stop performing redundant neighboring cell optimization.

According to the method for optimizing a neighbor relation provided in this embodiment, a centralized device acquires, from a radio network controller RNC, handover-related performance data of user equipment UE within a coverage area of a serving cell, where the serving cell is a UMTS cell, and determines whether a third count value reaches a preset redundant neighboring cell detection period. If it is determined that the third count value reaches the redundant neighboring cell detection period, the centralized device acquires a first redundant neighboring cell list of the serving cell according to the performance data, removes, according to a cell in a whitelist preset by a user, the cell in the whitelist from the first redundant neighboring cell list, and determines cells in a new neighboring cell list acquired after removal of the cell in the whitelist as to-be-processed neighboring cells, where each of the to-be-processed neighboring cells includes an intra-frequency cell of the serving cell, or an inter-frequency cell or a GSM cell. The centralized device generates an optimization suggestion for redundant neighboring cells according to the determined to-be-processed neighboring cells, where the optimization suggestion for redundant neighboring cells is used to instruct the RNC to delete the to-be-processed neighboring cells from the neighboring cell list. The centralized device delivers the optimization suggestion to the radio network controller RNC. The centralized device adds one to a fourth count value, where the fourth count value is used to describe a quantity of times of delivering the optimization suggestion for redundant neighboring cells to the RNC. The centralized device determines whether a fourth count value to which one is added is less than a preset quantity of redundant neighboring cell detection times, and if yes, continues to perform redundant neighboring cell optimization. As a result, a redundant neighboring cell of the UMTS cell is deleted from a neighboring cell list of the cell, thereby automatically optimizing the neighbor relation.

Figure 4:
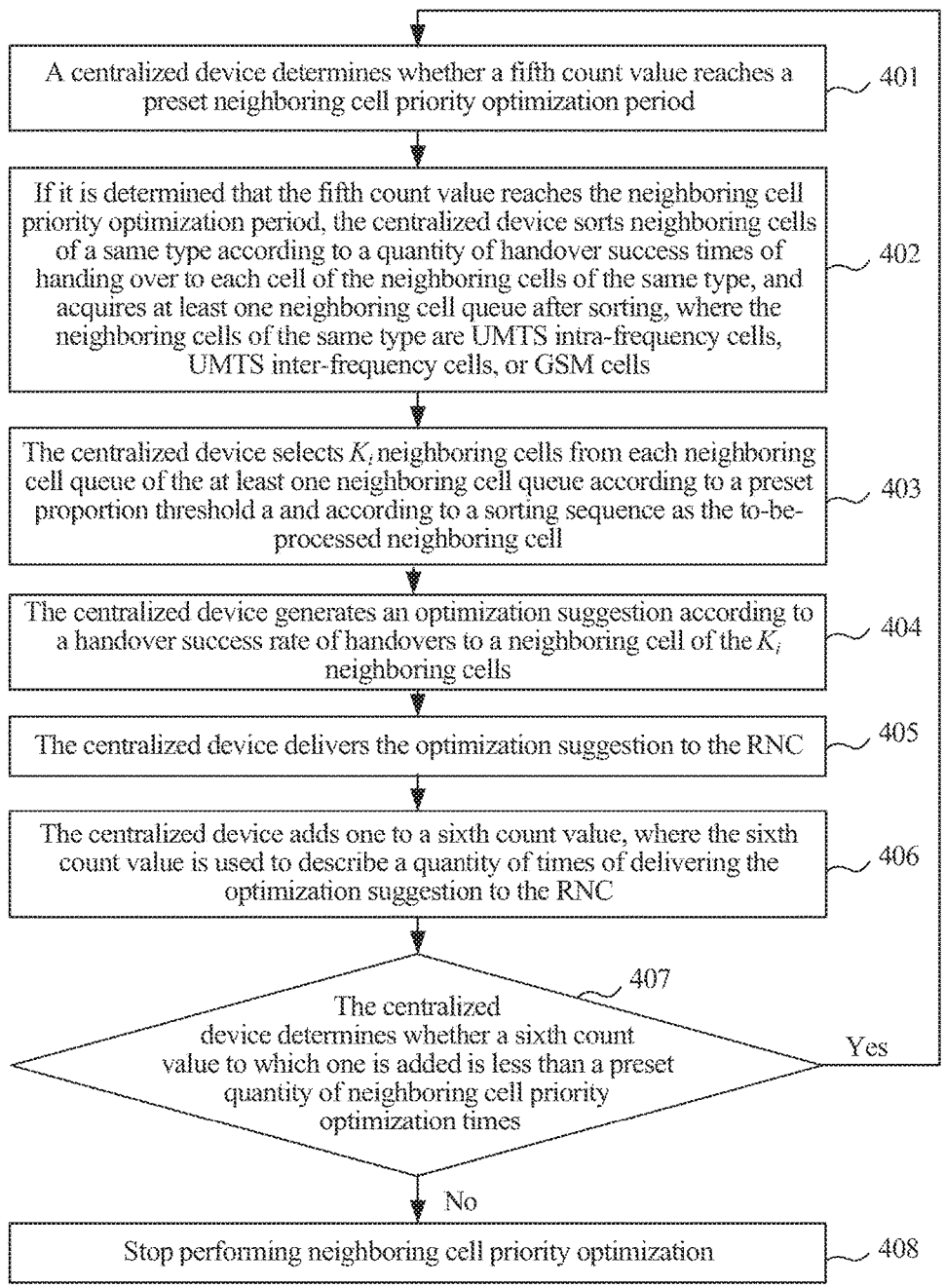
FIG. 4 is a flowchart of a method for optimizing a neighbor relation according to Embodiment 4 of the present invention.

On the basis of the foregoing Embodiment 1, optimization is further performed in an embodiment. FIG. 4 is a flowchart of a method for optimizing a neighbor relation according to Embodiment 4 of the present invention. This embodiment describes a process for optimizing a neighboring cell priority within a UMTS system and between a UMTS system and a GSM system. Referring to FIG. 4, the method in this embodiment may include the following steps:

401. The centralized device determines whether a fifth count value reaches a preset neighboring cell priority optimization period.

402. If it is determined that the fifth count value reaches the neighboring cell priority optimization period, the centralized device sorts neighboring cells of a same type according to a quantity of handover success times of handovers to each cell of the neighboring cells of the same type, and acquires at least one neighboring cell queue after sorting, where the neighboring cells of the same type are UMTS intra-frequency cells, UMTS inter-frequency cells, or GSM cells.

403. The centralized device selects $K_i$ neighboring cells from each neighboring cell queue of the at least one neighboring cell queue according to a preset proportion threshold a and according to a sorting sequence as the to-be-processed neighboring cells.

$K_i = a \times M_i$, $K_i$ indicates a quantity of neighboring cells selected from an $i^{th}$ neighboring cell queue, $M_i$ indicates a quantity of neighboring cells included in the $i^{th}$ neighboring cell queue, and i is an integer greater than or equal to 1, and less than or equal to 3.

For example, a proportion threshold is set to 80%, cells that rank ahead and that take up 80% in a total quantity of sorted cells of the same type are selected as the to-be-processed neighboring cells according to a sorting sequence.

404. The centralized device generates an optimization suggestion according to a handover success rate of handovers to a neighboring cell of the $K_i$ neighboring cells.

For example, that the centralized device generates an optimization suggestion according to a handover success rate of handovers to a neighboring cell of the $K_i$ neighboring cells may be implemented in the following manners:

If a handover success rate of handovers to a first neighboring cell of the $K_i$ neighboring cells is greater than or equal to a preset high threshold for a handover success rate, the centralized device generates an optimization suggestion of increasing a priority of the first neighboring cell by one level. If a handover success rate of handovers to a second neighboring cell of the $K_i$ neighboring cells is less than the high threshold for a handover success rate, and greater than a low threshold for a handover success rate, the centralized device generates an optimization suggestion of remaining a priority of the second neighboring cell unchanged. If a handover success rate of handovers to a third neighboring cell of the $K_i$ neighboring cells is less than or equal to the low threshold for a handover success rate, the centralized device generates an optimization suggestion of lowering a priority of the third neighboring cell by one level.

It should be noted that in steps 403 and 404, if a cell in the sorted neighboring cells of the same type ranks among the first 80% of the total quantity of the sorted cells of the same type, it indicates that a quantity of times of handovers to the cell is relatively large. Therefore, a handover success rate parameter of the cell is typical, and a neighboring cell priority of the cell may be adjusted according to the handover success rate parameter. If a cell ranks among the last 20% of the total quantity of the sorted cells of the same type, it indicates that a quantity of handover times is excessively small. Therefore, a handover success rate is untypical, and a neighboring cell priority is not adjusted.

405. The centralized device delivers the optimization suggestion to the RNC.

406. The centralized device adds one to a sixth count value, where the sixth count value is used to describe a quantity of times of delivering the optimization suggestion to the RNC.

407. The centralized device determines whether a sixth count value to which one is added is less than a preset quantity of neighboring cell priority optimization times. If yes, step 401 is performed; otherwise, step 408 is performed.

408. Stop performing neighboring cell priority optimization.

According to the method for optimizing a neighbor relation provided in this embodiment, a centralized device determines whether a fifth count value reaches a preset neighboring cell priority optimization period. If it is determined that the fifth count value reaches the neighboring cell priority optimization period, the centralized device sorts neighboring cells of a same type according to a quantity of handover success times of handovers to each cell of the neighboring cells of the same type, acquires at least one neighboring cell queue after sorting, selects $K_i$ neighboring cells from each neighboring cell queue of the at least one neighboring cell queue according to a preset proportion threshold a and according to a sorting sequence as the to-be-processed neighboring cells, and generates an optimization suggestion according to a handover success rate of handovers to a neighboring cell of the $K_i$ neighboring cells. The centralized device delivers the optimization suggestion to an RNC. The centralized device adds one to a sixth count value, where the sixth count value is used to describe a quantity of times of delivering the optimization suggestion to the RNC, and determines whether a sixth count value to which one is added is less than a preset quantity of neighboring cell priority optimization times, so that a neighboring cell priority of a neighboring cell of a UMTS cell is automatically adjusted. If yes, the centralized device continues to perform a process for optimizing the neighboring cell priority, thereby automatically optimizing the neighbor relation.

Figure 5A:
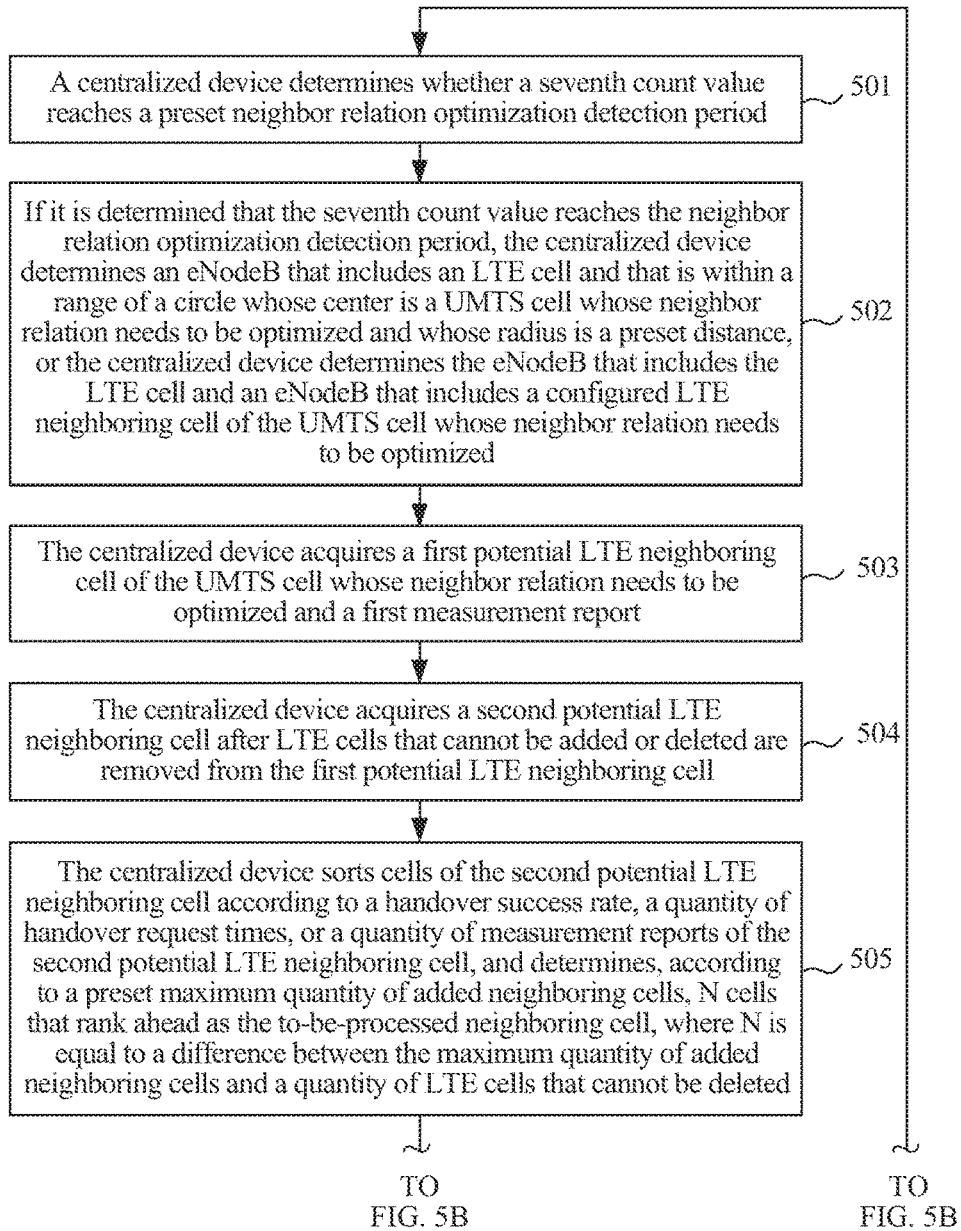
FIG. 5A and FIG. 5B are a flowchart of a method for optimizing a neighbor relation according to Embodiment 5 of the present invention.
Figure 5B:
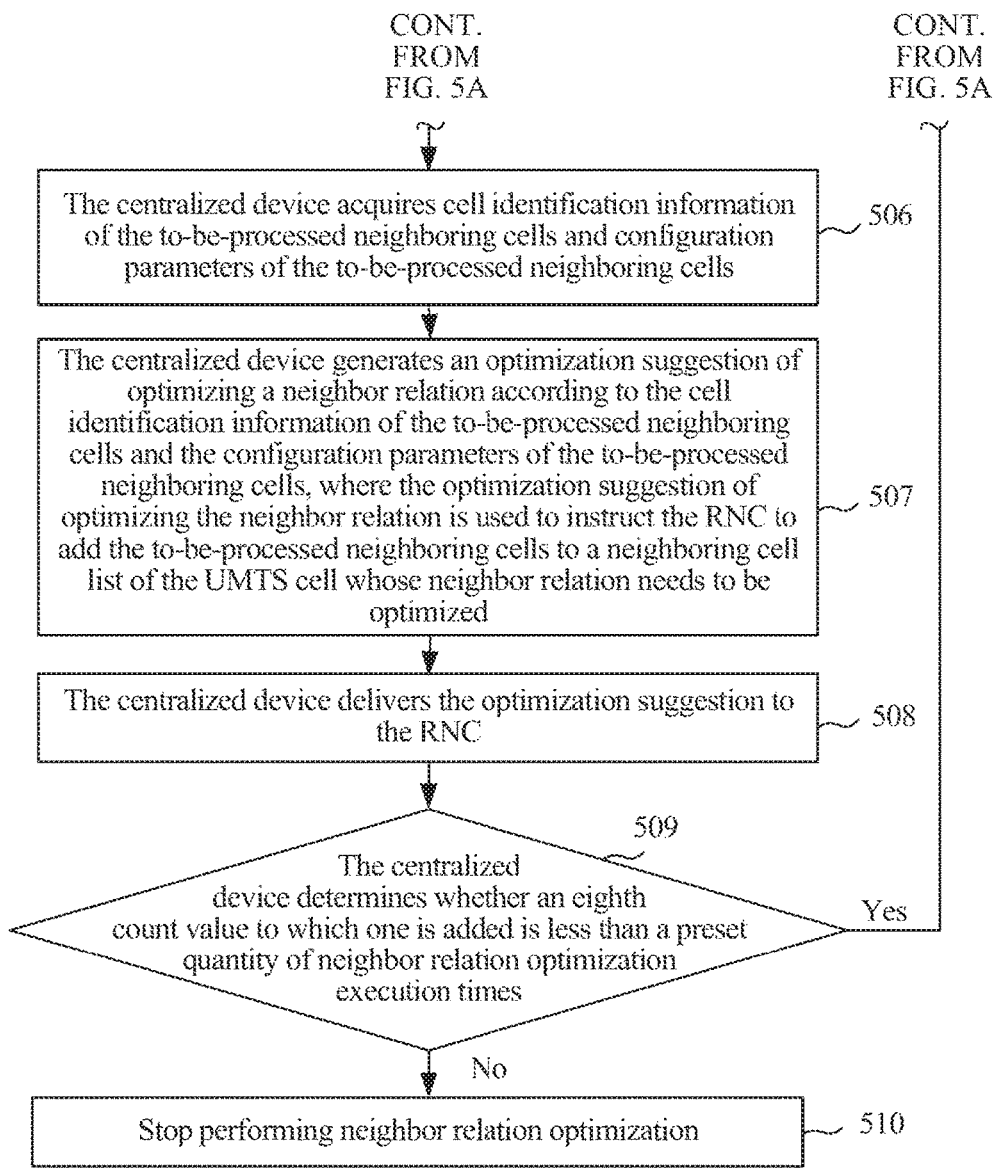

On the basis of the foregoing Embodiment 1, optimization is further performed in an embodiment. FIG. 5A and FIG. 5B are a flowchart of a method for optimizing a neighbor relation according to Embodiment 5 of the present invention. This embodiment describes a process for optimizing a neighbor relation within a UMTS system and between a UMTS system and an LTE system. Referring to FIG. 5A and FIG. 5B, the method in this embodiment may include the following steps:

501. The centralized device determines whether a seventh count value reaches a preset neighbor relation optimization detection period.

502. If it is determined that the seventh count value reaches the neighbor relation optimization detection period, the centralized device determines an eNodeB that includes an LTE cell and that is within a range of a circle with a center being a UMTS cell whose neighbor relation needs to be optimized and with a radius being a preset distance, or the centralized device determines the eNodeB that includes the LTE cell and an eNodeB that includes a configured LTE neighboring cell of the UMTS cell whose neighbor relation needs to be optimized.

503. The centralized device acquires a first potential LTE neighboring cell of the UMTS cell whose neighbor relation needs to be optimized and measurement report of the first potential LTE neighboring cell.

It should be noted that the first potential LTE neighboring cell is acquired by the centralized device according to measurement that is performed by the eNodeB that includes the LTE cell on the UMTS cell in a neighbor relation list of the LTE cell, or the first potential LTE neighboring cell is acquired by the centralized device according to measurement that is performed by the eNodeB that includes the LTE cell on the UMTS cell in a neighbor relation list of the LTE cell and measurement that is performed by the eNodeB that includes the LTE neighboring cell on the UMTS cell in a neighbor relation list of the LTE neighboring cell.

504. The centralized device acquires a second potential LTE neighboring cell after LTE cells that cannot be added or deleted are removed from the first potential LTE neighboring cell.

505. The centralized device sorts cells of the second potential LTE neighboring cell according to a handover success rate, a quantity of handover request times, or a quantity of measurement reports of the second potential LTE neighboring cell, and determines, according to a preset maximum quantity of added neighboring cells, N cells that rank ahead as the to-be-processed neighboring cells, where N is equal to a difference between the maximum quantity of added neighboring cells and a quantity of LTE cells that cannot be deleted.

506. The centralized device acquires cell identification information of the to-be-processed neighboring cells and configuration parameters of the to-be-processed neighboring cells.

507. The centralized device generates an optimization suggestion of optimizing a neighbor relation according to the cell identification information of the to-be-processed neighboring cells and the configuration parameters of the to-be-processed neighboring cells, where the optimization suggestion of optimizing the neighbor relation is used to instruct the RNC to add the to-be-processed neighboring cells to a neighboring cell list of the UMTS cell whose neighbor relation needs to be optimized.

508. The centralized device delivers the optimization suggestion to the RNC.

The centralized device adds one to an eighth count value, where the eighth count value is used to describe a quantity of times of delivering the optimization suggestion of optimizing the neighbor relation to the RNC.

509. The centralized device determines whether an eighth count value to which one is added is less than a preset quantity of neighbor relation optimization execution times. If yes, step 501 is performed; otherwise, step 510 is performed.

510. Stop performing neighbor relation optimization.

According to the method for optimizing a neighbor relation provided in this embodiment, a centralized device acquires a second potential LTE neighboring cell after LTE cells that cannot be added or deleted are removed from the first potential LTE neighboring cell, sorts cells of the second potential LTE neighboring cell according to a handover success rate, a quantity of handover request times, or a quantity of measurement reports of the second potential LTE neighboring cell, determines, according to a preset maximum quantity of added neighboring cells, N cells that rank ahead as the to-be-processed neighboring cells, acquires cell identification information of the to-be-processed neighboring cells and configuration parameters of the to-be-processed neighboring cells, generates an optimization suggestion of optimizing a neighbor relation according to the cell identification information of the to-be-processed neighboring cells and the configuration parameters of the to-be-processed neighboring cells, where the optimization suggestion of optimizing the neighbor relation is used to instruct an RNC to add the to-be-processed neighboring cells to a neighboring cell list of a UMTS cell whose neighbor relation needs to be optimized, delivers the optimization suggestion to the RNC, adds one to an eighth count value, and determines whether an eighth count value to which one is added is less than a preset quantity of neighbor relation optimization execution times and if yes, continues to perform neighbor relation optimization. As a result, an LTE missing neighboring cell of the UMTS cell is added to a neighboring cell list of the cell or a redundant neighboring cell of the cell is deleted from a neighboring cell list of the cell, thereby implementing automatic optimization of the neighbor relation.

Figure 6:
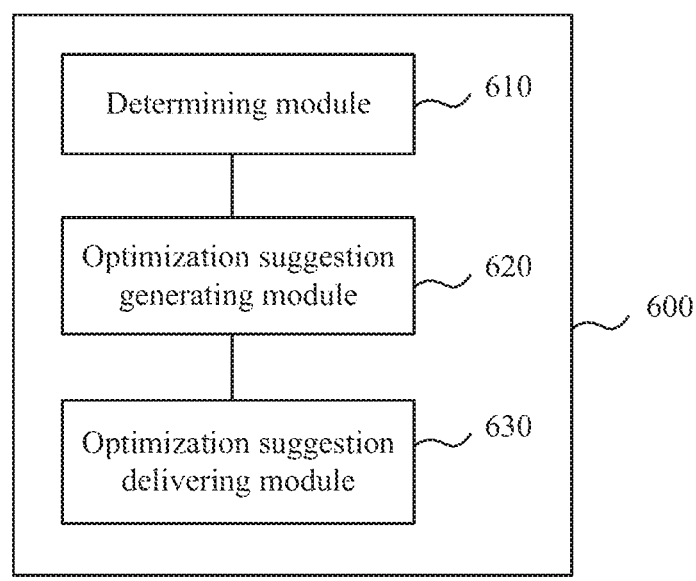
FIG. 6 is a schematic structural diagram of an apparatus 60o for optimizing a neighbor relation according to Embodiment 6 of the present invention.

FIG. 6 is a schematic structural diagram of an apparatus 600 for optimizing a neighbor relation according to Embodiment 6 of the present invention. The apparatus in this embodiment applies to a case of automatically optimizing the neighbor relation. The apparatus is generally implemented by using hardware and/or software. Referring to FIG. 6, the apparatus includes the following modules: a determining module 610, an optimization suggestion generating module 620, and an optimization suggestion delivering module 630.

The determining module 610 is configured to determine to-be-processed neighboring cells according to a preset rule; the optimization suggestion generating module 620 is configured to generate an optimization suggestion according to the determined to-be-processed neighboring cells; and the optimization suggestion delivering module 630 is configured to deliver the optimization suggestion to a radio network controller RNC, so that the RNC optimizes the to-be-processed neighboring cells according to the optimization suggestion.

Further, before determining the to-be-processed neighboring cells according to the preset rule, the determining module 610 is further configured to acquire, from the radio network controller RNC, a measurement report obtained based on measurement performed on a to-be-measured cell by user equipment UE within a coverage area of a serving cell, where the serving cell is a UMTS cell, and the to-be-measured cell includes an intra-frequency cell of the serving cell, or an inter-frequency cell or a GSM cell; determine whether a first count value reaches a preset missing neighboring cell detection period; and if it is determined that the first count value reaches the missing neighboring cell detection period, acquire a first missing neighboring cell list from the RNC, where the first missing neighboring cell list is a list including cells that are selected from the to-be-measured cell by the RNC according to the measurement report and that are not in a neighboring cell list of the serving cell.

Further, the determining module 610 is specifically configured to determine distances between each cell in the first missing neighboring cell list and the serving cell; use cells whose distances between each cell in the first missing neighboring cell list and the serving cell are less than or equal to a preset missing distance threshold as to-be sorted cells, sort all the to-be sorted cells according to distances between the to-be sorted cell and the serving cell to acquire a sorted missing neighboring cell list, and use the sorted missing neighboring cell list as a second missing neighboring cell list; and acquire a third missing neighboring cell list after removal of a cell in a blacklist from the second missing neighboring cell list, and determine the to-be-processed neighboring cells from the third missing neighboring cell list according to a preset maximum quantity of neighboring cells of the serving cell.

Further, the optimization suggestion generating module 620 is specifically configured to acquire cell identification information of the to-be-processed neighboring cells and configuration parameters of the to-be-processed neighboring cells; and generate an optimization suggestion for missing neighboring cells according to the cell identification information of the to-be-processed neighboring cells and the configuration parameters of the to-be-processed neighboring cells, where the optimization suggestion for missing neighboring cells is used to instruct the RNC to add the to-be-processed neighboring cells to the neighboring cell list.

Further, the determining module 610 is further configured to: after the optimization suggestion is delivered to the radio network controller RNC, add one to a second count value, where the second count value is used to describe a quantity of times of delivering the optimization suggestion for missing neighboring cells to the RNC, and determine whether a second count value to which one is added is less than a preset quantity of missing neighboring cell detection times; and if it is determined that the second count value to which one is added is less than the quantity of missing neighboring cell detection times, repeatedly perform the step of acquiring, from the RNC, a measurement report obtained based on measurement performed on a to-be-measured cell by UE within a coverage area of a serving cell.

Optionally, the determining module 610 is further configured to: before determining the to-be-processed neighboring cells according to the preset rule, acquire, from the radio network controller RNC, handover-related performance data of user equipment UE within a coverage area of a serving cell, where the serving cell is a UMTS cell; determine whether a third count value reaches a preset redundant neighboring cell detection period; and if it is determined that the third count value reaches the redundant neighboring cell detection period, acquire a first redundant neighboring cell list of the serving cell according to the performance data.

Further, the determining module 610 is specifically configured to remove, according to a cell in a whitelist preset by a user, the cell in the whitelist from the first redundant neighboring cell list; and determine cells in a new neighboring cell list acquired after removal of the cell in the whitelist as the to-be-processed neighboring cells, where each of the to-be-processed neighboring cells includes an intra-frequency cell of the serving cell, or an inter-frequency cell or a GSM cell.

Further, the optimization suggestion generating module 620 is specifically configured to generate an optimization suggestion for redundant neighboring cells according to the determined to-be-processed neighboring cells, where the optimization suggestion for redundant neighboring cells is used to instruct the RNC to delete the to-be-processed neighboring cells from the neighboring cell list.

Further, the determining module 610 is further configured to: after the optimization suggestion is delivered to the radio network controller RNC, add one to a fourth count value, where the fourth count value is used to describe a quantity of times of delivering the optimization suggestion for redundant neighboring cells to the RNC, and determine whether a fourth count value to which one is added is less than a preset quantity of redundant neighboring cell detection times; and if it is determined that the fourth count value to which one is added is less than the quantity of redundant neighboring cell detection times, repeatedly perform the step of acquiring, from the RNC, handover-related performance data of UE within a coverage area of a serving cell.

Further, the determining module 610 is specifically configured to: determine whether a fifth count value reaches a preset neighboring cell priority optimization period; if it is determined that the fifth count value reaches the neighboring cell priority optimization period, sort neighboring cells of a same type according to a quantity of handover success times of handovers to each cell of the neighboring cells of the same type, and acquire at least one neighboring cell queue after sorting, where the neighboring cells of the same type are UMTS intra-frequency cells, UMTS inter-frequency cells, or GSM cells; and select $K_i$ neighboring cells from each neighboring cell queue of the at least one neighboring cell queue according to a preset proportion threshold a and according to a sorting sequence as the to-be-processed neighboring cells, where $K_i = a \times M_i$, $K_i$ indicates a quantity of neighboring cells selected from an $i^{th}$ neighboring cell queue, $M_i$ indicates a quantity of neighboring cells included in the $i^{th}$ neighboring cell queue, and i is an integer greater than or equal to 1, and less than or equal to 3.

Further, the optimization suggestion generating module 620 is specifically configured to generate an optimization suggestion according to a handover success rate of handovers to a neighboring cell of the $K_i$ neighboring cells.

Further, the optimization suggestion generating module 620 is specifically configured to: if a handover success rate of handovers to a first neighboring cell of the $K_i$ neighboring cells is greater than or equal to a preset high threshold for a handover success rate, generate an optimization suggestion of increasing a priority of the first neighboring cell by one level; if a handover success rate of handovers to a second neighboring cell of the $K_i$ neighboring cells is less than the high threshold for a handover success rate, and greater than a low threshold for a handover success rate, generate an optimization suggestion of remaining a priority of the second neighboring cell unchanged; and if a handover success rate of handovers to a third neighboring cell of the $K_i$ neighboring cells is less than or equal to the low threshold for a handover success rate, generate an optimization suggestion of lowering a priority of the third neighboring cell by one level.

Further, the determining module 610 is further configured to: after the optimization suggestion is delivered to the radio network controller RNC, add one to a sixth count value, where the sixth count value is used to describe a quantity of times of delivering the optimization suggestion to the RNC, and determine whether a sixth count value to which one is added is less than a preset quantity of neighboring cell priority optimization times; and if it is determined that the sixth count value to which one is added is less than the quantity of neighboring cell priority optimization times, repeatedly perform the step of determining whether a fifth count value reaches a preset neighboring cell priority optimization period.

Optionally, the determining module 610 is further configured to: before determining the to-be-processed neighboring cells according to the preset rule, determine whether a seventh count value reaches a preset neighbor relation optimization detection period; and if it is determined that the seventh count value reaches the neighbor relation optimization detection period, determine an eNodeB that includes an LTE cell and that is within a range of a circle with a center being a UMTS cell whose neighbor relation needs to be optimized and with a radius being a preset distance, or determine the eNodeB that includes the LTE cell and an eNodeB that includes a configured LTE neighboring cell of the UMTS cell whose neighbor relation needs to be optimized.

Further, the determining module 610 is specifically configured to: acquire a first potential LTE neighboring cell of the UMTS cell whose neighbor relation needs to be optimized and a measurement report of the first potential LTE neighboring cell; acquire a second potential LTE neighboring cell after LTE cells that cannot be added or deleted are removed from the first potential LTE neighboring cell; and sort cells of the second potential LTE neighboring cell according to a handover success rate, a quantity of handover request times, or a quantity of measurement reports of the second potential LTE neighboring cell, and determine, according to a preset maximum quantity of added neighboring cells, N cells that rank ahead as the to-be-processed neighboring cells, where N is equal to a difference between the maximum quantity of added neighboring cells and a quantity of LTE cells that cannot be deleted. The first potential LTE neighboring cell is acquired according to measurement that is performed by the eNodeB that includes the LTE cell on the UMTS cell in a neighbor relation list of the LTE cell. Alternatively, the first potential LTE neighboring cell is acquired according to measurement that is performed by the eNodeB that includes the LTE cell on the UMTS cell in a neighbor relation list of the LTE cell and measurement that is performed by the eNodeB that includes the LTE neighboring cell on the UMTS cell in a neighbor relation list of the LTE neighboring cell.

Further, the optimization suggestion generating module 620 is specifically configured to acquire cell identification information of the to-be-processed neighboring cells and configuration parameters of the to-be-processed neighboring cells; and generate an optimization suggestion of optimizing a neighbor relation according to the cell identification information of the to-be-processed neighboring cells and the configuration parameters of the to-be-processed neighboring cells, where the optimization suggestion of optimizing the neighbor relation is used to instruct the RNC to add the to-be-processed neighboring cells to a neighboring cell list of the UMTS cell whose neighbor relation needs to be optimized.

Further, the determining module 610 is further configured to: after the optimization suggestion is delivered to the radio network controller RNC, add one to an eighth count value, where the eighth count value is used to describe a quantity of times of delivering the optimization suggestion of optimizing the neighbor relation to the RNC, and determine whether an eighth count value to which one is added is less than a preset quantity of neighbor relation optimization execution times; and if it is determined that the eighth count value to which one is added is less than the quantity of neighbor relation optimization execution times, repeatedly perform the step of determining whether a seventh count value reaches a preset neighbor relation optimization detection period.

According to the apparatus for optimizing a neighbor relation provided in this embodiment, a centralized device determines to-be-processed neighboring cells according to a preset rule, generates an optimization suggestion according to the determined to-be-processed neighboring cells, and delivers the optimization suggestion to an RNC, so that the RNC optimizes the to-be-processed neighboring cells according to the optimization suggestion. As a result, automatic optimization of the neighbor relation is implemented.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A method, comprising:
    acquiring, by a device from a radio network controller (RNC), a measurement report obtained based on measurement performed on a plurality of to-be-measured cells by a user equipment (UE) within a coverage area of a serving cell, wherein the serving cell is a UMTS cell, and the plurality of to-be-measured cells comprise an intra-frequency cell of the serving cell, or an inter-frequency cell of the serving cell or a GSM cell;
    acquiring, by the device, a first missing neighboring cell list from the RNC, wherein the first missing neighboring cell list is a list comprising a plurality of cells that are selected from the plurality of to-be-measured cells by the RNC according to the measurement report and that are not in a neighboring cell list of the serving cell;
    determining, by the device, distances between each cell in the first missing neighboring cell list and the serving cell;
    using, by the device, the cell in the first missing neighboring cell list, whose distance between the cell in the first missing neighboring cell list and the serving cell is less than or equal to a preset missing distance threshold, as a to-be-sorted cell, sorting the to-be-sorted cell according to distance between the to-be-sorted cell and the serving cell to acquire a sorted missing neighboring cell list, and using the sorted missing neighboring cell list as a second missing neighboring cell list;
    determining a to-be-processed neighboring cell from the second missing neighboring cell list according to a preset maximum quantity of a neighboring cell of the serving cell;
    generating, by the device, an optimization suggestion according to the to-be-processed neighboring cell, wherein the optimization suggestion comprises command information that instructs the RNC to add the to-be-processed neighboring cell to the neighboring cell list; and
    delivering, by the device, the optimization suggestion to the RNC, so that the RNC optimizes the to-be-processed neighboring cell according to the optimization suggestion.

2. The method according to claim 1, before the acquiring, by the device, a first missing neighboring cell list from the RNC, further comprising:
    determining, by the device, a first count value reaches a preset missing neighboring cell detection period.

3. The method according to claim 2, wherein the second missing neighboring cell list is a missing neighboring cell list with removal of a cell in a blacklist.

4. A device, comprising:
a processor; and
a non-transitory computer-readable storage medium coupled to the processor and storing programming instructions for execution by the processor, the programming instructions instruct the processor to:
acquire from a radio network controller (RNC), a measurement report obtained based on measurement performed on a plurality of to-be-measured cells by a user equipment (UE) within a coverage area of a serving cell, wherein the serving cell is a UMTS cell, and the plurality of to-be-measured cells comprise an intra-frequency cell of the serving cell, or an inter-frequency cell of the serving cell or a GSM cell;
acquire a first missing neighboring cell list from the RNC, wherein the first missing neighboring cell list is a list comprising a plurality of cells that are selected from the plurality of to-be-measured cells by the RNC according to the measurement report and that are not in a neighboring cell list of the serving cell;
determine distances between each cell in the first missing neighboring cell list and the serving cell;
use the cell in the first missing neighboring cell list, whose distance between the cell in the first missing neighboring cell list and the serving cell is less than or equal to a preset missing distance threshold, as a to-be-sorted cell, sorting the to-be-sorted cell according to distance between the to-be-sorted cell and the serving cell to acquire a sorted missing neighboring cell list, and using the sorted missing neighboring cell list as a second missing neighboring cell list;
determine a to-be-processed neighboring cell from the second missing neighboring cell list according to a preset maximum quantity of a neighboring cell of the serving cell;
generate an optimization suggestion according to the determined to-be-processed neighboring cell, wherein the optimization suggestion comprises command information that instructs the RNC to add the to-be-processed neighboring cell to the neighboring cell list; and
deliver the optimization suggestion to the RNC, so that the RNC optimizes the to-be-processed neighboring cell according to the optimization suggestion.

5. The device according to claim 4, before the acquiring a first missing neighboring cell list from the RNC, the programming instructions instruct the processor to:
determine a first count value reaches a preset missing neighboring cell detection period.

6. The device according to claim 5, wherein
the second missing neighboring cell list is a missing neighboring cell list with removal of a cell in a blacklist.

7. A device, comprising:
a processor; and
a non-transitory computer-readable storage medium coupled to the processor and storing programming instructions for execution by the processor, the programming instructions instruct the processor to:
sort a plurality of neighboring cells of a same type according to a quantity of handover success times of handovers to each neighboring cell of the same type, and acquire a neighboring cell queue after sorting, wherein the plurality of neighboring cells of the same type are UMTS intra-frequency cells, UMTS inter-frequency cells, or GSM cells;
select $K_i$ neighboring cells from the neighboring cell queue according to a preset proportion threshold a and according to a sorting sequence as a to-be-processed neighboring cell, wherein $K_i = a \times M_i$, $K_i$ indicates a quantity of neighboring cells selected from an $i^{th}$ neighboring cell queue, $M_i$ indicates a quantity of neighboring cells comprised in the $i^{th}$ neighboring cell queue, and i is an integer greater than or equal to 1, and less than or equal to 3;
generate an optimization suggestion according to a handover success rate of handovers to a neighboring cell of the $K_i$ neighboring cells, wherein the optimization suggestion comprises command information that instructs a priority of the neighboring cell of the $K_i$ neighboring cells;
deliver the optimization suggestion to the RNC, so that the RNC optimizes the to-be-processed neighboring cell according to the optimization suggestion.

8. The device according to claim 7, wherein the instructions to generate an optimization suggestion according to a handover success rate of handovers to a neighboring cell of the $K_i$ neighboring cells, comprises:
when a handover success rate of handovers to a first neighboring cell of the $K_i$ neighboring cells is greater than or equal to a preset high threshold for a handover success rate, generate the optimization suggestion of increasing a priority of the first neighboring cell by one level.

9. The device according to claim 7, wherein the instructions to generate an optimization suggestion according to a handover success rate of handovers to a neighboring cell of the $K_i$ neighboring cells, comprises:
when a handover success rate of handovers to a second neighboring cell of the $K_i$ neighboring cells is less than the high threshold for a handover success rate, and greater than a low threshold for a handover success rate, generate the optimization suggestion of remaining a priority of the second neighboring cell unchanged.

10. The device according to claim 7, wherein the generating, by the centralized device, an optimization suggestion according to a handover success rate of handovers to a neighboring cell of the $K_i$ neighboring cells, comprises:
when a handover success rate of handovers to a third neighboring cell of the $K_i$ neighboring cells is less than or equal to the low threshold for a handover success rate, generating, by the centralized device, the optimization suggestion of lowering a priority of the third neighboring cell by one level.

11. A device, comprising:
a processor; and
a non-transitory computer-readable storage medium coupled to the processor and storing programming instructions for execution by the processor, the programming instructions instruct the processor to:
when a first count value reaches the neighbor relation optimization detection period,
determine an eNodeB comprising an LTE cell that is within a range of a circle with a center being a UMTS cell whose neighbor relation needs to be optimized and with a radius being a preset distance;
acquire a first potential LTE neighboring cell of the UMTS cell whose neighbor relation needs to be optimized and a measurement report of the first potential LTE neighboring cell;

acquire a second potential LTE neighboring cell after a LTE cell that cannot be added or deleted is removed from the first potential LTE neighboring cell;

sort the second potential LTE neighboring cell according to a handover success rate, a quantity of handover request times, or a quantity of measurement reports of the second potential LTE neighboring cell to generate a sorted cell list, each of cell elements in the sorted cell list having a rank;

determine, according to the rank of each of the cell elements in the sorted cell list, the top N cells as a to-be-processed neighboring cell, wherein N is equal to a difference between a preset maximum quantity of added neighboring cells and a quantity of the LTE cell that cannot be deleted;

generate an optimization suggestion according to the to-be-processed neighboring cell, wherein the optimization suggestion comprises command information that instructs the RNC to add the to-be-processed neighboring cell to a neighboring cell list of the UMTS cell whose neighbor relation needs to be optimized;

deliver the optimization suggestion to a radio network controller (RNC), so that the RNC optimizes the to-be-processed neighboring cell according to the optimization suggestion;

wherein the first potential LTE neighboring cell is acquired by the device according to a measurement that is performed by the eNodeB comprising the LTE cell, on the UMTS cell in a neighbor relation list of the LTE cell; or wherein the first potential LTE neighboring cell is acquired by the device according to
- a measurement that is performed by the eNodeB comprising the LTE cell, on the UMTS cell in a neighbor relation list of the LTE cell, and
- a measurement that is performed by another eNodeB comprising the LTE neighboring cell, on the UMTS cell in a neighbor relation list of the LTE neighboring cell.

12. A device, comprising:
a processor; and
a non-transitory computer-readable storage medium coupled to the processor and storing programming instructions for execution by the processor, the programming instructions instruct the processor to:

when a first count value reaches the neighbor relation optimization detection period, determine an eNodeB comprising an LTE cell that is within a range of a circle with a center being a UMTS cell whose neighbor relation needs to be optimized and with a radius being a preset distance and an eNodeB comprising a configured LTE neighboring cell of the UMTS cell whose neighbor relation needs to be optimized;

acquire a first potential LTE neighboring cell of the UMTS cell whose neighbor relation needs to be optimized and a measurement report of the first potential LTE neighboring cell;

acquire a second potential LTE neighboring cell after a LTE cell that cannot be added or deleted is removed from the first potential LTE neighboring cell;

sort the second potential LTE neighboring cell according to a handover success rate, a quantity of handover request times, or a quantity of measurement reports of the second potential LTE neighboring cell to generate a sorted cell list, each of cell elements in the sorted cell list having a rank;

determine, according to the rank of each of the cell elements in the sorted cell list, the top N cells as a to-be-processed neighboring cell, wherein N is equal to a difference between a preset maximum quantity of added neighboring cells and a quantity of the LTE cell that cannot be deleted;

generate an optimization suggestion according to the to-be-processed neighboring cell, wherein the optimization suggestion comprises command information that instructs the RNC to add the to-be-processed neighboring cell to a neighboring cell list of the UMTS cell whose neighbor relation needs to be optimized; and deliver the optimization suggestion to a radio network controller (RNC), so that the RNC optimizes the to-be-processed neighboring cell according to the optimization suggestion;

wherein the first potential LTE neighboring cell is acquired by the device according to a measurement that is performed by the eNodeB comprising the LTE cell, on the UMTS cell in a neighbor relation list of the LTE cell; or wherein the first potential LTE neighboring cell is acquired by the device according to
- a measurement that is performed by the eNodeB comprising the LTE cell, on the UMTS cell in a neighbor relation list of the LTE cell, and
- a measurement that is performed by another eNodeB comprising the LTE neighboring cell, on the UMTS cell in a neighbor relation list of the LTE neighboring cell.

13. A method, comprising:
sorting, by a device, a plurality of neighboring cells of a same type according to a quantity of handover success times of handovers to each neighboring cell of the same type, and acquiring a neighboring cell queue after sorting, wherein the plurality of neighboring cells of the same type are UMTS intra-frequency cells, UMTS inter-frequency cells, or GSM cells;

selecting, by the device, $K_i$ neighboring cells from the neighboring cell queue according to a preset proportion threshold a and according to a sorting sequence as a to-be-processed neighboring cell, wherein $K_i=a \times M_i$, $K_i$ indicates a quantity of neighboring cells selected from an $i^{th}$ neighboring cell queue, $M_i$ indicates a quantity of neighboring cells comprised in the $i^{th}$ neighboring cell queue, and i is an integer greater than or equal to 1, and less than or equal to 3;

generating, by the device, an optimization suggestion according to a handover success rate of handovers to a neighboring cell of the $K_i$ neighboring cells, wherein the optimization suggestion comprises command information that instructs a priority of the neighboring cell of the $K_i$ neighboring cells;

delivering, by the device, the optimization suggestion to the RNC, so that the RNC optimizes the to-be-processed neighboring cell according to the optimization suggestion.

14. A method, comprising:
when a first count value reaches the neighbor relation optimization detection period, determining, by a device, an eNodeB comprising an LTE cell that is within a range of a circle with a center being a UMTS cell whose neighbor relation needs to be optimized and with a radius being a preset distance;

acquiring, by the device, a first potential LTE neighboring cell of the UMTS cell whose neighbor relation needs to be optimized and a measurement report of the first potential LTE neighboring cell;

acquiring, by the device, a second potential LTE neighboring cell after a LTE cell that cannot be added or deleted is removed from the first potential LTE neighboring cell;

sorting, by the device, the second potential LTE neighboring cell according to a handover success rate, a quantity of handover request times, or a quantity of measurement reports of the second potential LTE neighboring cell to generate a sorted cell list, each of cell elements in the sorted cell list having a rank;

determining, by the device, according to the rank of each of the cell elements in the sorted cell list, the top N cells as a to-be-processed neighboring cell, wherein N is equal to a difference between a preset maximum quantity of added neighboring cells and a quantity of the LTE cell that cannot be deleted;

generating, by the device, an optimization suggestion according to the to-be-processed neighboring cell, wherein the optimization suggestion comprises command information that instructs the RNC to add the to-be-processed neighboring cell to a neighboring cell list of the UMTS cell whose neighbor relation needs to be optimized;

delivering, by the device, the optimization suggestion to a radio network controller (RNC), so that the RNC optimizes the to-be-processed neighboring cell according to the optimization suggestion;

wherein the first potential LTE neighboring cell is acquired by the device according to a measurement that is performed by the eNodeB comprising the LTE cell, on the UMTS cell in a neighbor relation list of the LTE cell; or wherein the first potential LTE neighboring cell is acquired by the device according to
  a measurement that is performed by the eNodeB comprising the LTE cell, on the UMTS cell in a neighbor relation list of the LTE cell, and
  a measurement that is performed by another eNodeB comprising the LTE neighboring cell, on the UMTS cell in a neighbor relation list of the LTE neighboring cell.

* * * * *